United States Patent [19]
Hirota et al.

[11] Patent Number: 5,468,351
[45] Date of Patent: Nov. 21, 1995

[54] APPARATUS FOR RECOVERING FRESH WATER AND APPARATUS FOR CONCENTRATING LIQUID

[75] Inventors: Toshizumi Hirota, Hiratsuka; Hitoshi Kobayashi, Tokyo; Yasunobu Nakagoshi, Kobe; Yukio Amino, Tokyo, all of Japan

[73] Assignees: Mitsubishi Corporation; Mitsubishi Gas Chemical Company, Inc., both of Tokyo; Nihon Polytech Co., Ltd., Hyogo, all of Japan

[21] Appl. No.: 192,608

[22] Filed: Feb. 7, 1994

[30] Foreign Application Priority Data

Feb. 26, 1993 [JP] Japan .................................. 5-061461

[51] Int. Cl.⁶ .................................. B01D 3/00; C02F 1/14
[52] U.S. Cl. .................. 202/234; 159/903; 159/DIG. 15; 159/DIG. 21; 202/185.4; 202/190; 202/267.1; 202/267.2; 203/10; 203/86; 203/DIG. 1
[58] Field of Search .................................. 203/10, DIG. 1, 203/86; 202/267.2, 190, 267.1, 234, 185.4; 159/903, DIG. 15, DIG. 21, DIG. 23; 165/133; 156/282, 310, 332

[56] References Cited

U.S. PATENT DOCUMENTS

| | | | |
|---|---|---|---|
| 4,137,901 | 2/1979 | Maier | 203/DIG. 1 |
| 4,235,679 | 11/1980 | Swaidan | 203/DIG. 1 |
| 4,267,021 | 5/1981 | Speros et al. | 203/10 |
| 4,487,659 | 12/1984 | Stark | 203/DIG. 1 |
| 4,756,802 | 7/1988 | Finney | 203/DIG. 1 |
| 4,966,655 | 10/1990 | Wilkerson, Jr. | 203/DIG. 1 |

FOREIGN PATENT DOCUMENTS

| | | | |
|---|---|---|---|
| 3424452 | 10/1985 | Germany | 203/DIG. 1 |
| 3501396 | 7/1986 | Germany | 203/10 |
| 62-18253 | 1/1987 | Japan . | |
| 62-15933 | 1/1987 | Japan . | |
| 63-214438 | 9/1988 | Japan . | |

OTHER PUBLICATIONS

T. Honma et al., "Series of Books on Energy Science, No. 5, Natural Energy," p. 16, Kyoritsu Shuppan Kabushiki Kaisha (1980).

Primary Examiner—Virginia Manoharan
Attorney, Agent, or Firm—Wenderoth, Lind & Ponack

[57] ABSTRACT

An apparatus for recovering fresh water or for concentrating a liquid has a structure formed of a roof member 10 having a gradient and a base member 14 provided with a liquid reservoir member 18. A cellulose-based film 20 has one surface saponified 2 to 50 μm deep and the other surface is attached to the inner surface of the roof member. A liquid recovery member 16 is provided in the roof member or the base member, the liquid recovery member being for recovering water which is condensed on the saponified surface of the cellulose-based film and that flows downward.

10 Claims, 4 Drawing Sheets

Fig. IA
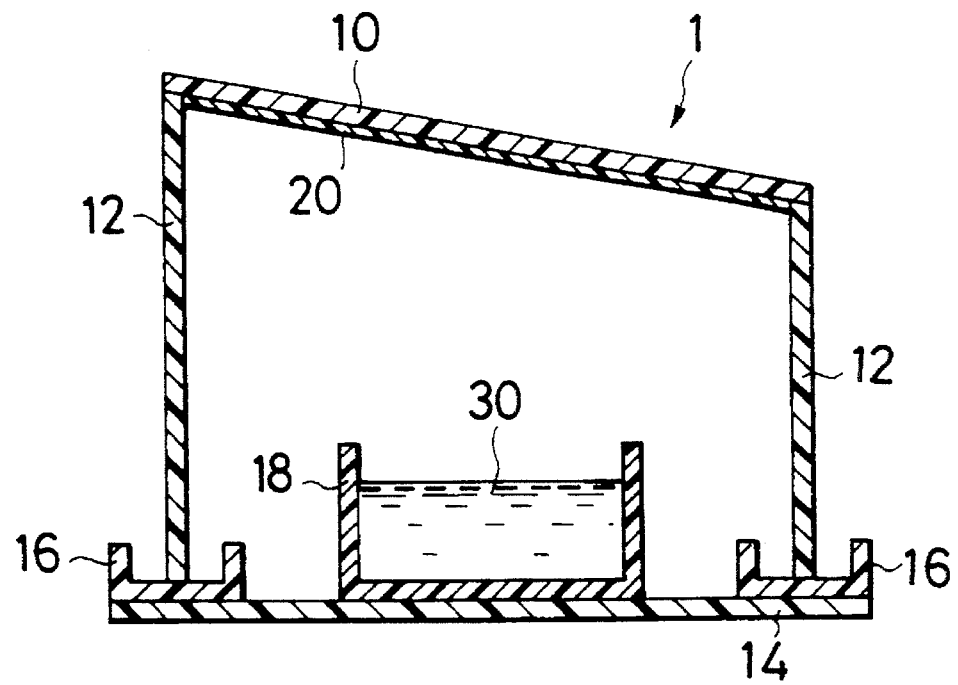
Fig. IB
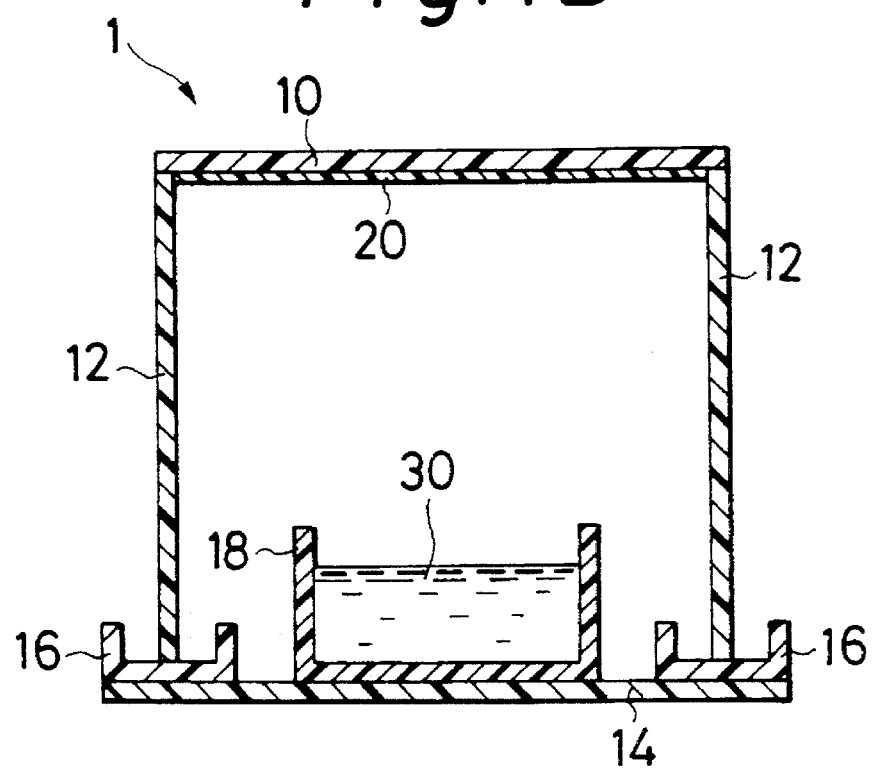

APPARATUS FOR RECOVERING FRESH WATER AND APPARATUS FOR CONCENTRATING LIQUID

BACKGROUND OF THE INVENTION AND RELATED ART

The present invention relates to an apparatus for recovering fresh water and an apparatus for concentrating liquid, to both of which is applied a film having an excellent performance in preventing the formation of stationary drops of dew.

In depopulated areas such as remote islands and secluded places in the mountains, it is very important to obtain and keep safe drinking water. In recent years, further, with the desertification of agricultural fields, the conversion of desert to agricultural land is an important issue in development as well as a population problem, and water supply is a great problem to be solved for accomplishing the conversion of desert to agricultural land.

When a large amount of seawater is desalted, there is used a large-scale plant which uses an ion-exchange method, a diaphragmatic osmosis method, a reverse osmosis method or a multi-flash method. These methods are effective for treating a large amount of seawater, while a vast amount of the cost is required for installing the plant, and a large amount of energy is also required for desalting seawater. Therefore, the cost for desalting seawater is high, and in most cases, it is difficult to install such a plant in a remote island or on a secluded place in the mountains in terms of plant cost and the supply of energy for the operation of the plant.

FIG. 5 is a schematic view of a known apparatus for recovering fresh water or concentrating liquid by means of solar energy, which apparatus is shown, for example, in a literature "Series of Books on Energy Science, No. 5, Natural Energy", pages 15–16, by Takuya Honma, et al., published May 5, 1980 by Kyoritsu Shuppan K.K. This apparatus has a roof member 10 made of glass or plastic, a base member 14, a liquid reservoir member 18 provided in the base member 14 and a liquid recovery member 16 provided in the base member 14.

In the above apparatus, sunlight which is transmitted through the roof member 10 increases the temperature inside the apparatus, and evaporates seawater stored in the liquid reservoir member 18. The evaporated water is condensed on the inner surface (to be sometimes referred to as "ceiling" hereinafter) of the roof member 10 due to a temperature difference between the roof member exposed to the atmosphere, and the ceiling, whereby distilled water is obtained.

However, the above apparatus has the following problem. Steam is condensed on the ceiling of the roof member 10, and the condensed water drops from the ceiling due to its own weight. That is, the water recovery ratio decreases or the liquid concentration efficiency decreases. There is another problem in that the condensed water on the ceiling of the roof member 10 prevents the transmission of sunlight.

OBJECT AND SUMMARY OF THE INVENTION

It is an object of the present invention to provide an apparatus for recovering fresh water at a high efficiency and an apparatus for concentrating a liquid at high efficiency.

For achieving the above object, the first aspect of the apparatus for recovering fresh water, provided by the present invention, is directed to an apparatus which comprises:

(A) a structure formed of a roof member having a gradient and a base member provided with a liquid reservoir member, (B) a cellulose-based film of which one surface is saponified 2 to 50 μm deep and the other surface is attached to the inner surface of the roof member, and (C) a liquid recovery member provided in the roof member or the base member, the liquid recovery member being for recovering water which is condensed on the saponified surface of the cellulose-based film and flows downward.

For achieving the above object, the second aspect of the apparatus for recovering fresh water provided by the present invention is directed to an apparatus which comprises:

(A) a structure formed of a roof member having a gradient, a base member provided with a liquid reservoir member and a wall member, (B) a cellulose-based film of which one surface is saponified 2 to 50 μm deep and the other surface is attached to at least the inner surface of the roof member, and (C) a liquid recovery member provided in the roof member, the wall member or the base member, the liquid recovery member being for recovering water which is condensed on the saponified surface of the cellulose-based film and flows downward.

In the second aspect of the apparatus for recovering fresh water provided by the present invention, preferred is an embodiment in which the inner surface of the wall member is also provided with the cellulose-based film and the liquid recovery member is provided in the wall member or the base member, since fresh water can be recovered effectively.

In the apparatus for recovering fresh water according to the first and second aspects of the present invention, the roof member may be formed of a material having a flat plate form, while it is preferably formed of a material whose cross section has a corrugated form or a repeated angular concavoconvex form for increasing the area of the cellulose-based film surface on which water is condensed. For example, when the cross section of the roof member has a corrugated form or a repeated angular concavoconvex form, the area of the cellulose-based film increases and fresh water effectively moves toward the peak portions of such a form which are nearest to the earth, whereby fresh water can be effectively recovered.

In the apparatus for recovering fresh water according to the first and second aspects of the present invention, the outer surface of the roof member is preferably provided with a cooling device for the flow of cooling water on the outer surface of the roof member. The cooling device can decrease the temperature of the cellulose-based film to thereby decrease the dew point. As a result, water can be condensed more effectively. Further, the liquid reservoir member preferably has a black inner surface. Due to the black color of the inner surface, the infrared absorption efficiency of the liquid reservoir member can be increased and the evaporation ratio of the liquid stored in the liquid reservoir member can be increased. As a result, the fresh water recovery rate can be increased.

For achieving the above object, the first aspect of the apparatus for concentrating a liquid, provided by the present invention, is directed to an apparatus which comprises:

(A) a structure formed of a roof member having a gradient and a base member provided with a liquid reservoir member, (B) a cellulose-based film of which one surface is saponified 2 to 50 μm deep and the other surface is attached to the inner surface of the roof member, and (C) a liquid recovery member provided in the roof member or the base member, the liquid recovery member being for recovering a liquid which is condensed on the saponified surface of the cellulose-based film and flows downward.

For achieving the above object, the second aspect of the apparatus for concentrating a liquid, provided by the present invention, is directed to an apparatus which comprises:

(A) a structure formed of a roof member having a gradient, a base member provided with a liquid reservoir member and a wall member, (B) a cellulose-based film of which one surface is saponified 2 to 50 μm deep and the other surface is attached to at least the inner surface of the roof member, and (C) a liquid recovery member provided in the roof member, the wall member or the base member, the liquid recovery member being for recovering a liquid which is condensed on the saponified surface of the cellulose-based film and flows downward.

In the second aspect of the apparatus for concentrating liquid, provided by the present invention, preferred is an embodiment in which the inner surface of the wall member is also provided with the cellulose-based film and the liquid recovery member is provided in the wall member or the base member, since the liquid can be recovered effectively.

In the apparatus for recovering a liquid according to the first and second aspects of the present invention, the roof member may be formed of a material having a flat plate form, while it is preferably formed of a material whose cross section has a corrugated form or a repeated angular concavoconvex form. For example, when the cross section of the roof member has a corrugated form or a repeated angular concavoconvex form, the area of the cellulose-based film for condensing a liquid increases, and a larger amount of a liquid can be condensed. As a result, the evaporation of a liquid is promoted, and the liquid concentration ratio can be improved.

In the apparatus for concentrating a liquid according to the first and second aspects of the present invention, the outer surface of the roof member is preferably provided with a cooling device for the flow of cooling water on the outer surface of the roof member. The cooling device can decrease the temperature of the cellulose-based film to thereby decrease the dew point. As a result, a liquid can be condensed mope effectively. Further, the liquid reservoir member preferably has a black inner surface. Due to the black color of the inner surface, the infrared absorption efficiency of the liquid reservoir member can be increased and the evaporation ratio of a liquid stored in the liquid reservoir member can be increased. As a result, the liquid concentration efficiency can be increased.

In the apparatus for recovering fresh water or the apparatus for concentrating a liquid provided by the present invention, the cellulose-based film is formed of a film material such as cellulose acetate, cellulose diacetate, cellulose triacetate, cellulose acetate butylate or cellulose propionate.

The cellulose-based film at least one surface of which is saponified 2 to 50 μm deep can be produced by immersing the film material in an aqueous solution containing a predetermined amount of sodium hydroxide and/or potassium hydroxide or in an aqueous solution containing benzyl alcohol in addition to the above hydroxide(s). The depth of the saponification can be controlled by adjusting the concentration of the above alkaline aqueous solution, the immersion temperature and the immersion time. When the film material has a small thickness, it may be saponified through the entire thickness.

The material(s) for the roof member and the wall member can be selected from any materials which have low heat insulating properties and have sufficient mechanical strength when used as a construction material. Examples of these materials include a plastic material, a metal material, glass and composite materials of these. The roof member is preferably formed of a material which can transmit infrared light and visible light, while it may be formed of a material which transmits no visible light. The material(s) for the roof member and the wall member are particularly preferably selected from those light-weight materials which have high resistance to corrosion caused by salt and have excellent weatherability and impact resistance. These materials include a polycarbonate resin, a fiber-reinforced acrylic resin, a fiber-reinforced polyester resin, a laminated material formed from a resin and a metal, and wired sheet glass. Particularly preferred is a polycarbonate resin which is excellent in durability and impact resistance.

For attaching the cellulose-based film to the inner surface (ceiling) of the roof member or the inner surface of the wall member, a general structural adhesive having durability may be used.

Further, the cellulose-based film may be attached to the ceiling or the wall member by the method disclosed in JP-A-62-18253 in which a heat-fusible film is attached to the "other" surface (not used for the condensation of water or a liquid thereon) of the cellulose-based film through a thermosetting adhesive and the heat-fusible film is heat-fused to the ceiling or the wall member. The above thermosetting adhesive includes polyurethane-containing thermosetting adhesives, polyacrylic thermosetting adhesives, polyester-containing thermosetting adhesives, polyimide-containing thermosetting adhesives, epoxy-containing thermosetting adhesives and acrylurethane-containing thermosetting adhesives. The above heat-fusible film includes an acrylic film, a polyvinyl chloride film, a polyvinyl chloride-vinyl acetate copolymer film, a polyamide film, a polyethylene-vinyl acetate film, a polyurethane film and a polyester film. The heat-fusible film has a thickness of 5 to 500 μm and has a melting point of 50° to 250° C.

Further, the cellulose-based film can be attached to the ceiling or the wall member by the method disclosed in JP-A-63-214438 in which a heat-fusible resin layer is formed on the "other" surface of the cellulose-based film and the heat-fusible resin layer is heat-fused to the ceiling or the wall member. The above heat-fusible resin layer can be formed of a synthetic resin having a melting point of 50° to 250° C., and examples of this synthetic resin include an acrylic resin, a polyvinyl chloride resin, a polyvinyl chloride-vinyl acetate copolymer resin, a polyamide resin, a polyethylene-vinyl acetate resin, a polyurethane resin and a polyester resin. The above heat-fusible resin layer can be formed by applying the above synthetic resin to the "other" surface of the cellulose-based film with a gravure coater, a roll coater, a reverse roll coater or a sprayer and drying the resultant coating.

The attaching of the cellulose-based film to the ceiling or the wall member includes:

(1) attaching, sticking or bonding the cellulose-based film to the ceiling or the wall member after the structure is formed, (2) attaching, sticking, bonding or laminating the cellulose-based film to/on a member which is to constitute the roof member or the wall member by an in-line method or a post-laminating method, and (3) integrally forming a laminate of the cellulose-based film and the ceiling or the wall member by forming the heat-fusible resin layer on the "other" surface of the cellulose-based film and molding a plastic material on the heat-fusible resin layer when the roof member or the wall member is formed from the plastic material.

Depending upon the structure, area, etc., of the roof member, when the cross section of the roof member has a flat plate form, the required minimum gradient of the ceiling is 3 degrees, preferably 5 degrees. And when the cross section of the roof member has a corrugated or repeated angular concavoconvex form, the required minimum gradient of the ceiling is 5 degrees, preferably 7 degrees.

When the roof member and the wall member are formed of plastic plates, it is preferred to form an ultraviolet-resistant resin layer on the outer surfaces of the roof member and the wall member, as is disclosed in Japanese Utility Model Laid-open Publication No. 62-15933. The above resin layer may be formed, for example, of an ultraviolet-resistant film. This ultraviolet-resistant film is formed, for example, from an acrylic resin of a methyl methacrylate/ butyl acrylate copolymer and an ultraviolet absorbent.

The outer surfaces of the roof member and the wall member formed of a plastic plate with or without an ultraviolet-resistant film may be imparted, for example, with scratch resistance and anti-contamination properties. For scratch resistance, a hard-coating agent selected from epoxy, acrylic, amino, urethane and polysiloxane hard-coating agents can be applied on the outer surfaces of the roof member and the wall member and then cured by heat or ultraviolet light. For anti-contamination properties, a film of polymethyl methacrylate or fluorine resin can be laminated, or a coating composition of polymethyl methacrylate or fluorine resin can be applied on the outer surfaces of the roof member and the wall member.

For promoting the evaporation of water or a liquid (to be sometimes simply referred to as "liquid" hereinafter) in the liquid reservoir member, for example, black stones, pebbles, etc., may be placed in the liquid reservoir member, and/or the liquid may be heated with a heater, in addition to using a black color on the inner surface. Further, the liquid reservoir member may be provided with a sand layer or an artificial lawn, to which the liquid can be sprayed.

In the apparatus for recovering fresh water or for concentrating a liquid, provided by the present invention, the cellulose-based film whose one surface is saponified 2 to 50 μm deep is attached to the ceiling, and the cellulose-based film has the excellent performance for preventing the formation of stationary drops of dew. Therefore, the liquid evaporated, for example, by sunlight condenses itself on the saponified surface of the cellulose-based film, but does not form stationary drops of dew. That is, the condensed liquid flows on the saponified surface of the cellulose-based film almost without dropping from the surface due to its own weight. Further, since the liquid does not form stationary drops of dew on the saponified surface but flows on the surface, the vapor pressure of the liquid around the saponified surface decreases to promote the evaporation of the liquid.

As described above, the liquid condensed on the saponified surface of the cellulose-based film does not drop off the saponified surface, and the evaporation of the liquid is promoted. Therefore, the apparatus for recovering fresh water produces fresh water at high efficiency, and the apparatus for concentrating a liquid produces a concentrated liquid at high efficiency. Further other advantages of the present invention will be apparent from the following description.

BRIEF DESCRIPTION OF THE DRAWINGS

The present invention will be further detailed with reference to drawings.

FIGS. 1A and 1B are schematic cross-sectional views of an apparatus shown in Example 1.

DESCRIPTION OF THE PREFERRED EMBODIMENTS

EXAMPLE 1

Figure 2:
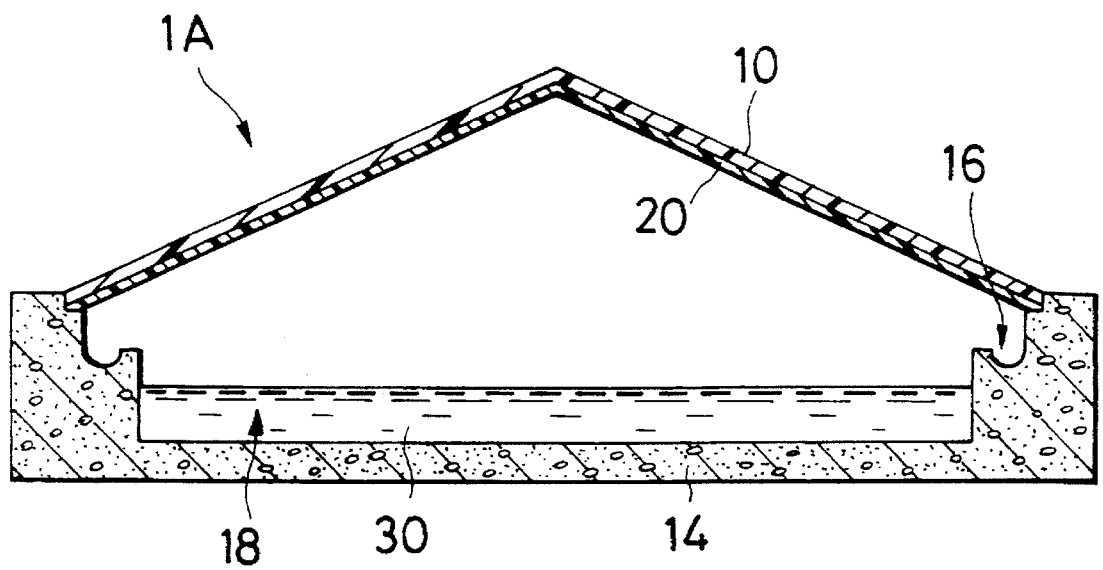
FIG. 2 is a schematic cross-sectional view of an apparatus shown in Example 2.

Example 1 is concerned with an apparatus for recovering fresh water according to the second aspect of the present invention or an apparatus for concentrating a liquid according to the second aspect of the present invention.

A test construction 1 was installed, of which the cross sections (cut along central lines in parallel with the side wall and the front wall) are schematically shown in FIG. 1A and FIG. 1B. The construction 1 had a width of 285 mm, a depth of 403 mm and a height of 275 mm at the highest side wall portion. A roof member 10 was unidirectionally slanting. The ceiling of the roof member 10 had an area of 1,158 cm$^2$ and had a gradient of 7.5 degrees. The roof member 10 and a wall member 12 were formed of flat plates of a polycarbonate resin. The outer surface of the roof member 10 had a 30 to 50 μm thick PMMA film laminated thereon for improving the weatherability thereof. The inner surface (ceiling) of the roof member 10 had a 24 μm thick cellulose-based film 20 attached thereto. The cellulose-based film 20 was saponified through its entire thickness.

The cellulose-based film 20 was attached to the ceiling of the roof member 10 by preliminarily attaching a 30 μm thick heat-fusible film of PMMA on the "other" surface of the cellulose-based film by a thermosetting adhesive and heat-fusing the heat-fusible film to the ceiling. In addition, the cellulose-based film attached to the inner surface of the wall member allows the liquid to flow down the wall member more smoothly.

A base member 14 (which may be referred to as "floor member") on which the wall member 12 stands or substantially stands is provided with a liquid recovery member 16 having the form of a gutter. Further, the base member 14 is also provided with a cylindrically formed liquid reservoir member 18 having a diameter of 200 mm (bottom area measuring 314 cm$^2$). In FIGS. 1A and 1B, numeral 30 indicates water. The liquid recovery member 16 is provided on the base member 14 in FIGS. 1A and 1B, while it may be provided at or near a lower end portion of the wall member 12 or the roof member 10.

For an experimental purpose, a heater (not shown) was placed in the liquid reservoir member 18, and a water recovery test was carried out as follows. Water was placed in the liquid reservoir member 18, and heated with the heater for 5 hours so that the water had a constant temperature. Five hours after the heating started, recovered water was measured for a total weight. Tables 1 to 4 show the results. Water stored in the liquid reservoir member 18 was evaporated by being heated with the heater, and evaporated water was condensed on the saponified surface of the cellulose-based film 20 attached to the ceiling of the roof member 10. Condensed water flowed along the saponified surface of the cellulose-based film 20 and further flowed down the surface of the wall member 12 to be recovered in the liquid recovery member 16.

COMPARATIVE EXAMPLE 1

A construction in which the structure was similar to that of the construction in Example 1 was installed. The difference between Example 1 and Comparative Example 1 was that the roof member and the wall member were formed of only flat plates of a polycarbonate resin having a thickness of 2 mm. In other words, Comparative Example 1 used no cellulose-based film which was to be attached to the ceiling of the roof member. The water recovery test was carried out in the same manner as in Example 1. Tables 1 to 4 show the results.

COMPARATIVE EXAMPLE 2

A construction in which the structure was similar to that of the Construction in Example 1 was installed. The difference between Example 1 and Comparative Example 2 was that the roof member and the wall member were formed of only flat plates of glass having a thickness of 1.8 mm. In other words, Comparative Example 2 used no cellulose-based film which was to be attached the ceiling of the roof member. The water recovery test was carried out in the same manner as in Example 1. Tables 1 to 4 show the results.

TABLE 1

Results of water recovery test A

|  | Ex. 1 | CEx. 1 | CEx. 2 |
| --- | --- | --- | --- |
| Temperature (°C.) of water | 80 | 80 | 80 |
| Temperature (°C.) of atmosphere | 22 | 22 | 22 |
| Temperature (°C.) inside construction | 44 | 44 | 44 |
| Relative humidity (%) inside construction | 80 | 80 | 80 |
| Amount (g) of recovered water | 666 | 433 | 452 |

TABLE 2

Results of water recovery test B

|  | Ex. 1 | CEx. 1 | CEx. 2 |
| --- | --- | --- | --- |
| Temperature (°C.) of water | 60 | 60 | 60 |
| Temperature (°C.) of atmosphere | 21 | 21 | 21 |
| Temperature (°C.) inside construction | 36 | 36 | 36 |
| Relative humidity (%) inside construction | 74 | 74 | 74 |
| Amount (g) of recovered water | 271 | 135 | 192 |

TABLE 3

Results of water recovery test C

|  | Ex. 1 | CEx. 1 | CEx. 2 |
| --- | --- | --- | --- |
| Temperature (°C.) of water | 40 | 40 | 40 |
| Temperature (°C.) of atmosphere | 20 | 20 | 20 |
| Temperature (°C.) inside construction | 26 | 26 | 26 |
| Relative humidity (%) inside construction | 79 | 79 | 79 |
| Amount (g) of recovered water | 55 | 0 | 38 |

TABLE 4

Results of water recovery test D

|  | Ex. 1 | CEx. 1 | CEx. 2 |
| --- | --- | --- | --- |
| Temperature (°C.) of water | 30 | 30 | 30 |
| Temperature (°C.) of atmosphere | 0 | 0 | 0 |
| Temperature (°C.) inside construction | 5 | 5 | 5 |
| Relative humidity (%) inside construction | 90 | 90 | 90 |
| Amount (g) of recovered water | 31 | 0 | 20 |

The test results show that the amount of recovered water is remarkably high when the cellulose-based film 20 is attached to the ceiling of the roof member 10. That is, water can be recovered, or a liquid can be concentrated, at a high efficiency.

EXAMPLE 2

Example 2 is concerned with an apparatus for recovering fresh water, or for concentrating a liquid, according to the first aspect of the present invention. FIG. 2 shows a schematic cross-sectional view of the apparatus used in Example 2. A roof member 10 has a hip-roofed structure. Differing from the construction used in Example 1, a construction 1A has no wall member. The roof member 10 was formed of flat plates of a polycarbonate resin having a thickness of 2 mm. For improving the weatherability, a PMMA film having a thickness of 30 to 50 μm was laminated on the outer surface of the roof member 10. A cellulose-based film 20 having a thickness of 24 μm was attached to the ceiling of the roof member 10 in the same manner as in Example 1. The cellulose-based film was saponified through its entire thickness.

A base member 14 has a liquid recovery member 16 having the form of a gutter near a place where the base member 14 supported the roof member 10. The liquid recovery member may be provided in a lower end portion of the roof member 10. The base member 14 had a liquid reservoir member (portion) 18. The outer surface of the liquid reservoir member 18 is preferably provided with a heat insulating material (not shown). A black-colored coating was provided on the inner surface of the liquid reservoir member 18. In FIG. 2, numeral 30 indicates a liquid. The base member 14 can be produced, for example, from concrete by a conventional method. A liquid, e.g., seawater, is introduced into the liquid reservoir member 18 though piping (not shown) by a pump (not shown).

EXAMPLE 3

Figure 3:
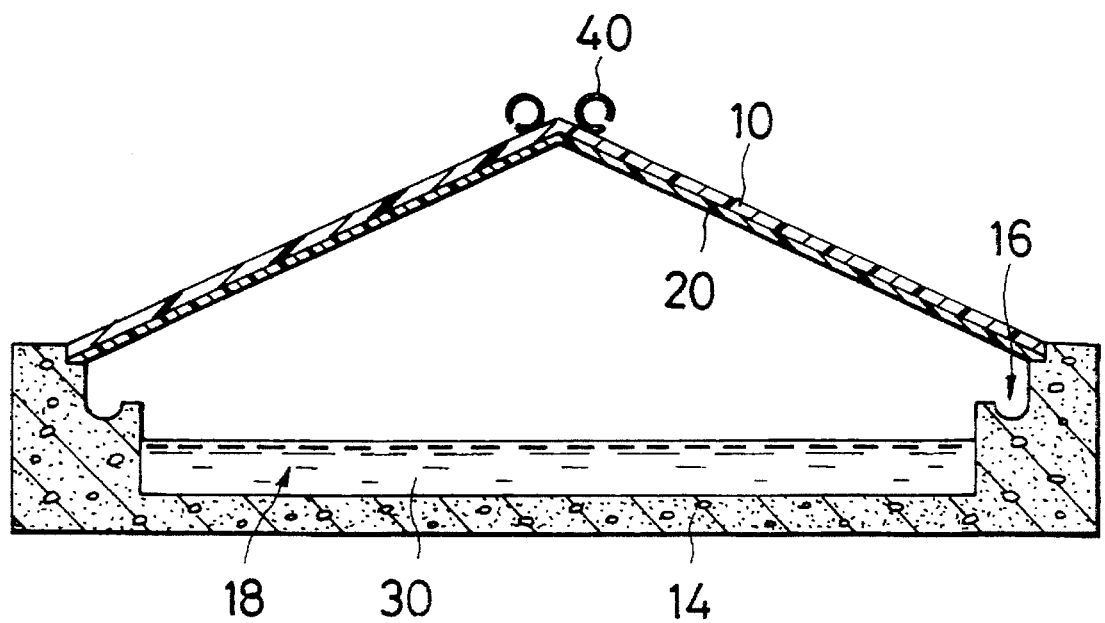
FIG. 3 is a schematic cross-sectional view of an apparatus shown in Example 3.

Example 3 is concerned with one variant of the apparatus shown in Example 2. The apparatus in Example 3 is provided with a cooling device 40 for the flow of cooling water on the outer surface of the roof member 10 as shown in FIG. 3. The cooling device 40 may be formed of a pipe of which the wall has numerous openings. The cooling device 40 is supplied, for example, with seawater through piping (not shown) by a pump (not shown) for effectively cooling the roof member 10. The cooling device 40 may be provided to the apparatus used in Example 1.

Figure 4A:
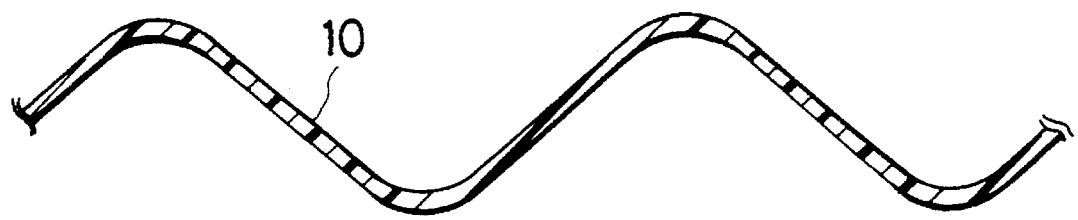
FIGS. 4A to 4D show various cross-sectional forms of roof members.
Figure 4B:
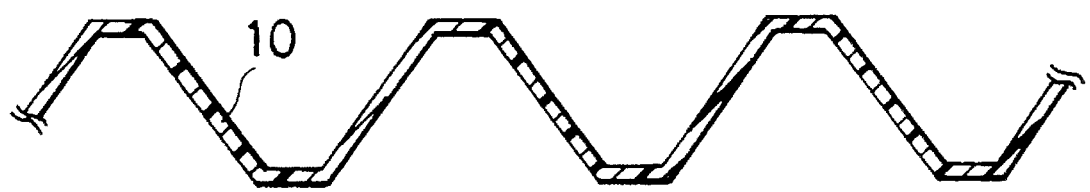
Figure 4C:
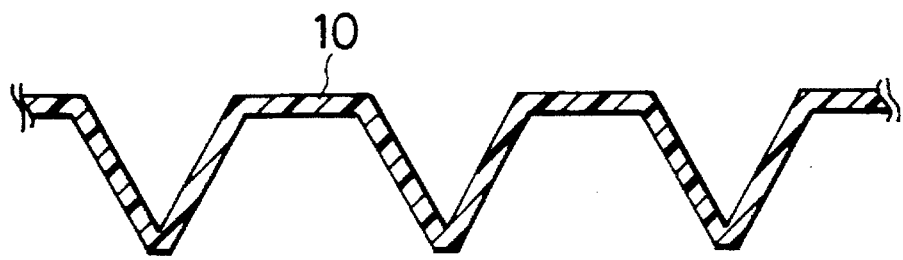
Figure 4D:
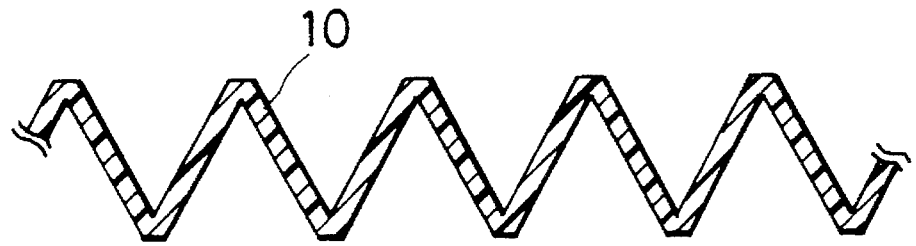
Figure 5:
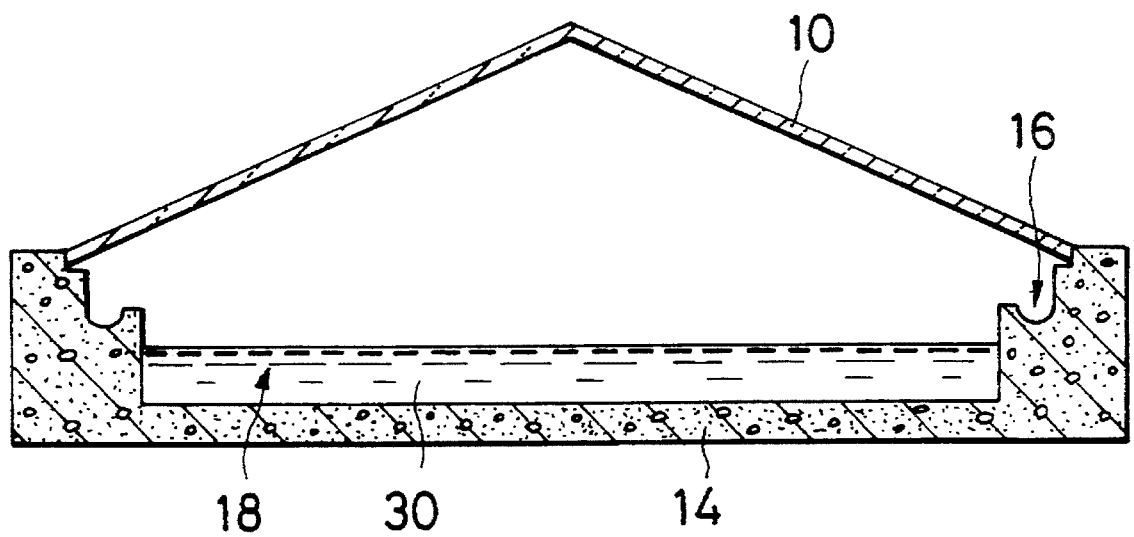
FIG. 5 is a schematic cross-sectional view of a conventional apparatus using sunlight for recovering fresh water or concentrating a liquid.

The present invention has been specified above on the basis of preferred embodiments, but the present invention shall not be limited to these embodiments. The roof member may have a corrugated form as shown in FIG. 4A, and it may also have a repeated angular concavoconvex form as shown in FIGS. 4B, 4C and 4D.

The apparatus of the present invention may be installed on the ground, and it may be also installed on a ship, a vessel or a raft when the base member is produced from a suitable material in a proper form. Further, it may be produced in such a design that it can be carried with a person or in a car and used as an apparatus for preparing drinking water in emergency.

The apparatus for recovering fresh water, provided by the present invention, is used, for example, for desalting seawater, purifying muddy water, and purifying rivers, effluent from a factory and waste water from a kitchen. The apparatus for concentrating a liquid provided by the present invention is used, for example, for concentrating seawater, producing salt from seawater, and concentrating a liquid containing foreign matter or impurities.

The apparatus for recovering fresh water or concentrating a liquid provided by the present invention can accomplish the recovery of fresh water or the concentration of a liquid with a high efficiency. Further, the apparatus of the present invention is very simply structured, and therefore can be produced at a low cost. The maintenance thereof is also facile. Moreover, the apparatus per se can be operated without energy such as electricity in some cases, and there is no limitation to be imposed on the site where the apparatus is to be installed. Further, the apparatus can be operated at a low running cost for recovering fresh water or concentrating a liquid.

What is claimed is:

1. An apparatus for distilling liquid, comprising:

a structure comprising a roof member having a gradient, an inner surface and a lower end portion, and a base member, said roof member being positioned over said base member and having cross-section having a form selected from the group consisting of a corrugated form and a repeated angular concavoconvex form;

a liquid reservoir member provided on said base member for storing liquid to be distilled by solar energy transmitted through said roof member;

means for preventing condensed liquid on the inner surface of the roof member from dropping down from the roof member and for improving the transmission of sunlight through the roof member comprising a cellulose-based film having one surface from which said film is saponifed to a 2 to 50 μm depth and another surface which is attached to said inner surface of said roof member; and a liquid recovery member positioned in one of two positions, said first position being in said roof member and said second position being on said base member adjacent to said lower end portion of said roof member, for recovering distilled liquid that is condensed on said saponified surface of said cellulose-based film.

2. The apparatus of claim 1, wherein said roof member comprises a polycarbonate resin plate.

3. The apparatus of claim 1, wherein said roof member has an outer surface opposite to said inner surface and said roof member further comprises a cooling apparatus for flowing cooling water down said outer surface of said roof member.

4. The apparatus of claim 1, wherein said liquid reservoir member has a black inner surface.

5. An apparatus for distilling liquid, comprising:

a structure comprising a roof member having a gradient and an inner surface, a base member, and a wall member, said roof member having a cross-section having a form selected from the group consisting of a corrugated form and a repeated angular concavoconvex form, and said wall member supporting said roof member over said base member;

a liquid reservoir member provided on said base member for storing liquid to be distilled by solar energy transmitted through said roof member;

means for preventing condensed liquid on the inner surface of the roof member from dropping down from the roof merit and for improving the transmission of sunlight through the roof member comprising a cellulose-based film having one surface from which said film is saponified to a 2 to 50 μm depth and another surface which is attached to at least said inner surface of said roof member; and a liquid recovery member positioned in one of three positions, said first position being in said roof member, said second position being in said wall member and said third position being on said base member, for recovering distilled liquid that is condensed on said saponified surface of said cellulose-based film.

6. The apparatus of claim 5, wherein said wall member has an inner surface that is provided with additional cellulose-based film having one surface from which said film is saponified to a 2 to 50 μm depth and another surface which is attached to said inner surface of said wall member, and wherein said liquid recovery member is in one of said second position and said third position.

7. The apparatus of claim 5, wherein said roof member comprises a polycarbonate resin plate.

8. The apparatus of claim 5, wherein said roof member has an outer surface opposite to said inner surface and said roof member further comprises a cooling apparatus for flowing cooling water down said outer surface of said roof member.

9. The apparatus of claim 5, wherein said liquid reservoir member has a black inner surface.

10. The apparatus of claim 5, wherein said liquid recovery member comprises a gutter located on a peripheral portion of said base member, and said wall member is positioned in said gutter.

* * * * *